United States Patent
Matsumoto

(10) Patent No.: US 7,783,111 B2
(45) Date of Patent: Aug. 24, 2010

(54) WRITING IMAGE ACQUISITION APPARATUS, WRITING INFORMATION EXTRACTION METHOD, AND STORAGE MEDIUM

(75) Inventor: Yukinori Matsumoto, Amagasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 904 days.

(21) Appl. No.: 11/416,195

(22) Filed: May 3, 2006

(65) Prior Publication Data

US 2007/0091393 A1 Apr. 26, 2007

(30) Foreign Application Priority Data

Oct. 24, 2005 (JP) .............................. 2005-308930

(51) Int. Cl.
*G06K 9/66* (2006.01)
(52) U.S. Cl. ..................... 382/190; 358/538; 358/462
(58) Field of Classification Search ................. 358/538; 382/190

See application file for complete search history.

(56) References Cited

U.S. PATENT DOCUMENTS

| 4,588,211 | A | * | 5/1986 | Greene ......................... 283/70 |
| 5,020,122 | A | * | 5/1991 | Walsh et al. ................. 382/236 |
| 5,930,405 | A | | 7/1999 | Chida |
| 6,940,617 | B2 | * | 9/2005 | Ma et al. ..................... 358/1.15 |

FOREIGN PATENT DOCUMENTS

| EP | 0585074 | 3/1994 |
| JP | 5-101064 | 4/1993 |
| JP | 6-110996 | 4/1994 |
| JP | 8-214201 | 8/1996 |
| JP | 10-32823 | 2/1998 |
| JP | 10-255027 | 9/1998 |
| JP | 11-272654 | 10/1999 |
| JP | 2000-112646 | 4/2000 |

OTHER PUBLICATIONS

Machine translated English version of JP10255027.*
Japanese Office Action mailed Oct. 7, 2008, directed to counterpart JP Application No. 2005-308930; 4 pages.
Japanese Office Action mailed Jul. 15, 2008 directed towards counterpart foreign application No. 2005-308930; 5 pages.

* cited by examiner

*Primary Examiner*—Samir A. Ahmed
*Assistant Examiner*—Ruiping Li
(74) *Attorney, Agent, or Firm*—Morrison & Foerster LLP

(57) ABSTRACT

An image forming apparatus is provided with a writing-present document reading processing portion that executes processing for reading a plurality of page images that are images of pages constituting a document, a writing page determining portion that determines whether or not there is a writing in each of the pages based on each of the input page images, and a writing image extracting portion that extracts a writing image that is an image of the writing only from the page image of a page for which it has been determined that there is a writing.

15 Claims, 14 Drawing Sheets

| WRITING IMAGE IDENTIFICATION NUMBER | ORIGINAL DOCUMENT IDENTIFICATION NUMBER | PAGE NUMBER | IMAGE DATA |
|---|---|---|---|
| 90001 | 10001 | 3 | ABC |
| 90002 | 10001 | 3 | XYZ |
| 90003 | 10012 | 25 | AAABBB |
| ⋮ | ⋮ | ⋮ | ⋮ |

WRITING IMAGE ACQUISITION APPARATUS, WRITING INFORMATION EXTRACTION METHOD, AND STORAGE MEDIUM

This application is based on Japanese Patent Application No. 2005-308930 filed on Oct. 24, 2005, the contents of which are hereby incorporated by reference.

BACKGROUND OF THE INVENTION

1. Field of the Invention

The present invention relates to a writing image acquisition apparatus that has an image-processing function, and the like.

2. Description of the Related Art

In recent years, various information has come to be made into electronic data and saved. This is because there are the following merits to save information as electronic data. It is possible to store much more data on an electromagnetic storage medium such as a CD-ROM or hard disk than on paper, and it is possible to greatly economize on the space of the location for safekeeping of information storage materials. Information can be easily shared using a network server. Also, because data can be simply encrypted, it is possible to prevent divulgence of information even in the event that information storage materials are stolen.

Because these merits are obtained, there are also companies that, after information conventionally kept on paper has been converted to electronic data by reading it with a scanner and saved, works to dispose of paper on which information has been written.

Scanners are widely used in order to convert information written on paper to electronic data. Also, a method using a scanner has been proposed, as disclosed in Japanese unexamined patent publication No. 11-272654. According to that method, it is possible to extract contents appended to a page space where the contents of an electronic file document have been printed.

In recent years, with the spread of portable terminal apparatuses such as notebook computers or PDAs (Personal Digital Assistants), there are increasing numbers of people who input notes conventionally written on a paper medium such as a notebook into a portable terminal apparatus and save the notes as electronic data. However, it is thought that there are many people who write notes on a paper medium just as before, and paper mediums for writing notes will continue to be found useful in the future as well. This is because with a paper medium, because it is not necessary to turn on power as in the case of a portable terminal apparatus, notes can be written immediately. Also, this is because notes using text, symbols, formulas, illustrations, charts and the like can be simply written with a pen without switching application software and tools.

Other than those, paper mediums have merits as follows. For example, in meetings or the like, documents printed on a paper medium are distributed to attendees, and each attendee can freely write notes of their thoughts during the meeting or remarks of other people in blank portions or between lines near relevant places in the documents distributed to each attendee. When notes are written in this manner, the relevance between the contents of notes and the contents of the documents will be easy to understand at a later date.

Even with respect to paper documents distributed to a plurality of people and to which information such as notes is appended, with the method disclosed in Japanese unexamined patent publication No. 11-272654, note portions are extracted and converted to electronic data, and such paper documents can be managed. Also, with respect to one document, it is possible to gather the electronic data of the information appended by each respective person.

However, with conventional methods like that disclosed in Japanese unexamined patent publication No. 11-272654, it may take time and labor to extract information appended to a document including a plurality of pages. That is, according to a conventional method, even when information is appended to only some of the pages of the document, it is necessary to extract the appended information page-by-page, which takes time. When a user manually removes only the pages to which information is appended, and extracts the appended information from those pages, this operation takes labor to perform.

SUMMARY OF THE INVENTION

In view of such problems, it is an object of the present invention to make it possible to extract information appended to an original document without taking as much time and labor as in the conventional technology.

According to one aspect of the present invention, a writing image acquisition apparatus includes a page image input portion that inputs a plurality of page images that are images of pages constituting a document, a writing page determining portion that determines whether or not there is a writing in each of the pages based on each of the input page images, and a writing image extraction portion that, for a page for which it has been determined that there is a writing, performs writing image extraction processing that extracts a writing image that is an image of a writing from the page image of the page, and for a page for which it has been determined that there is not a writing, does not perform the writing image extraction processing.

The writing page determining portion determines whether or not there is a writing in the page by the following method. For example, a rule is set for a user to mark in a predetermined position of the page where a writing is added. The writing page determining portion determines whether or not there is a writing in the page by whether or not there is a mark in a predetermined position of each of the input page images.

The writing image acquisition apparatus further includes an original image storage portion that stores original page images that are images of pages, constituting the document, in a state in which there is not a writing. The writing page determining portion determines whether or not there is a writing in the page by comparing an image in which a resolution of the page image of the page is reduced to an image in which a resolution of the original page image of the page is reduced.

In the present invention, "writing" means the action of a person appending information such as notes or the like by handwriting using a writing utensil such as a pen or the like to an original document, or that appended information. Adding information to an original document by pasting clippings from a newspaper, magazine, or the like, or by printing with a printing apparatus, and that added information, also fall under the meaning of "writing".

With the present invention, it is possible to extract information appended to an original document without taking as much time and labor as in the conventional technology.

These and other characteristics and objects of the present invention will become more apparent by the following descriptions of preferred embodiments with reference to drawings.

BRIEF DESCRIPTION OF THE DRAWINGS

FIG. 11 shows an example of a writing image database.

DESCRIPTION OF THE PREFERRED EMBODIMENTS

First Embodiment

Figure 1:
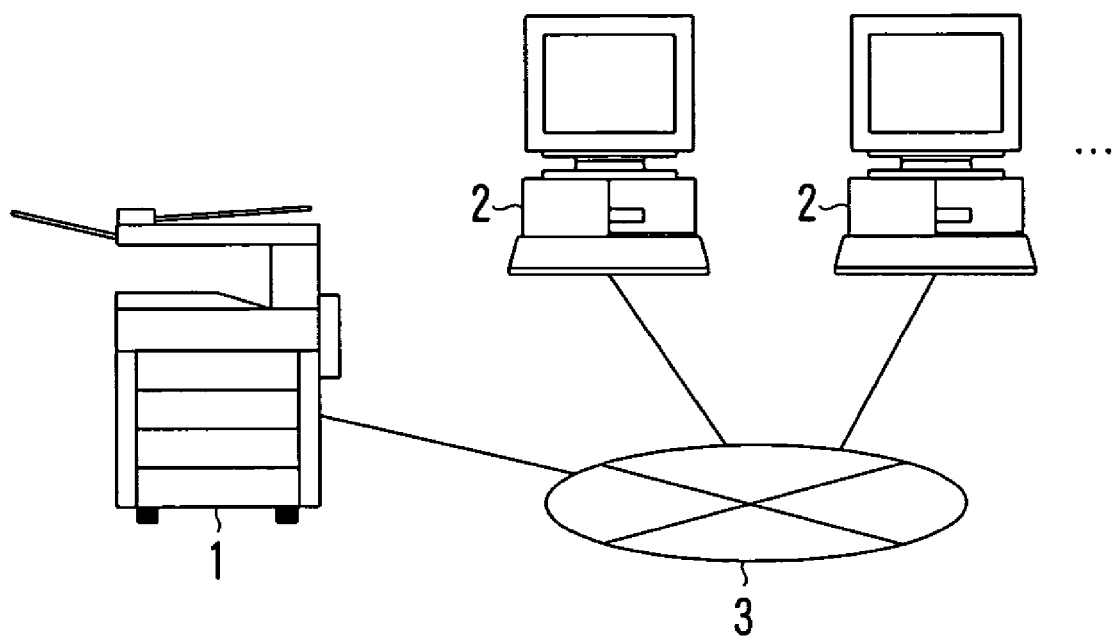
FIG. 1 shows an example of the configuration of an entire network provided with an image forming apparatus according to the present invention.
Figure 2:
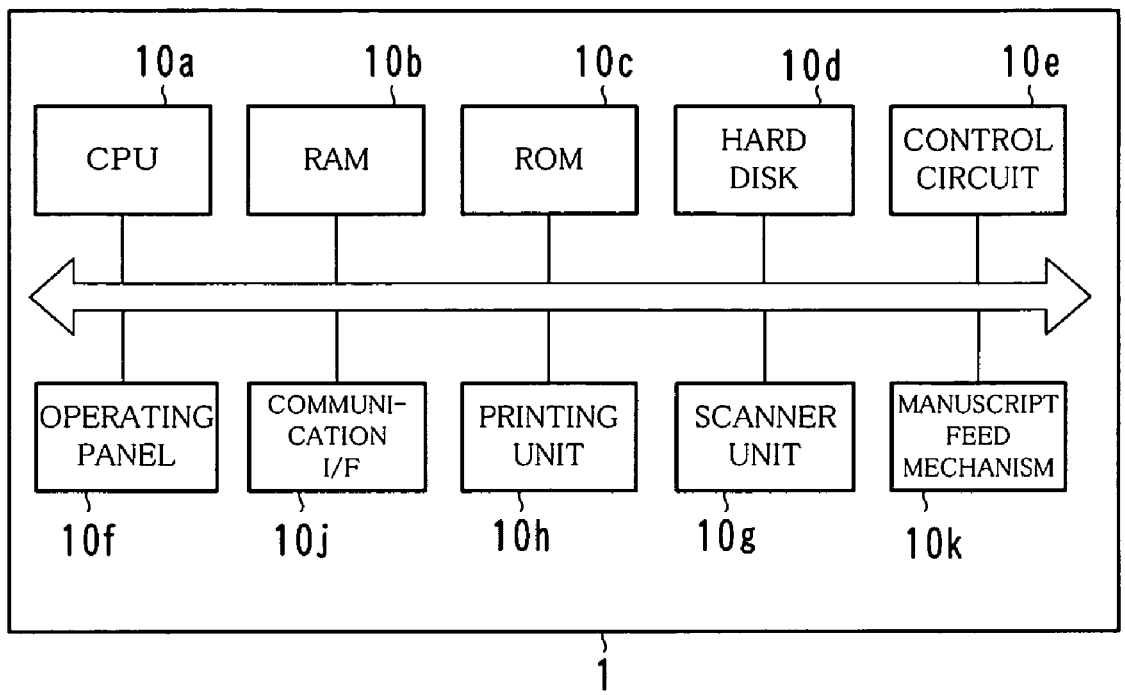
FIG. 2 shows an example of the hardware configuration of an image forming apparatus.
Figure 3:
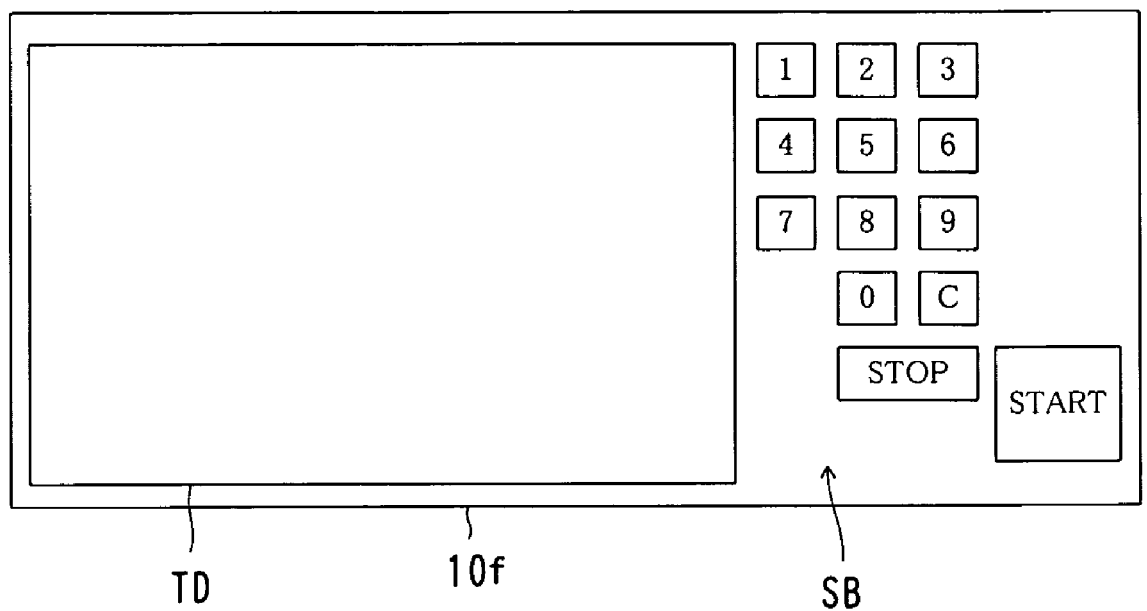
FIG. 3 shows an example of an operating panel.
Figure 4:
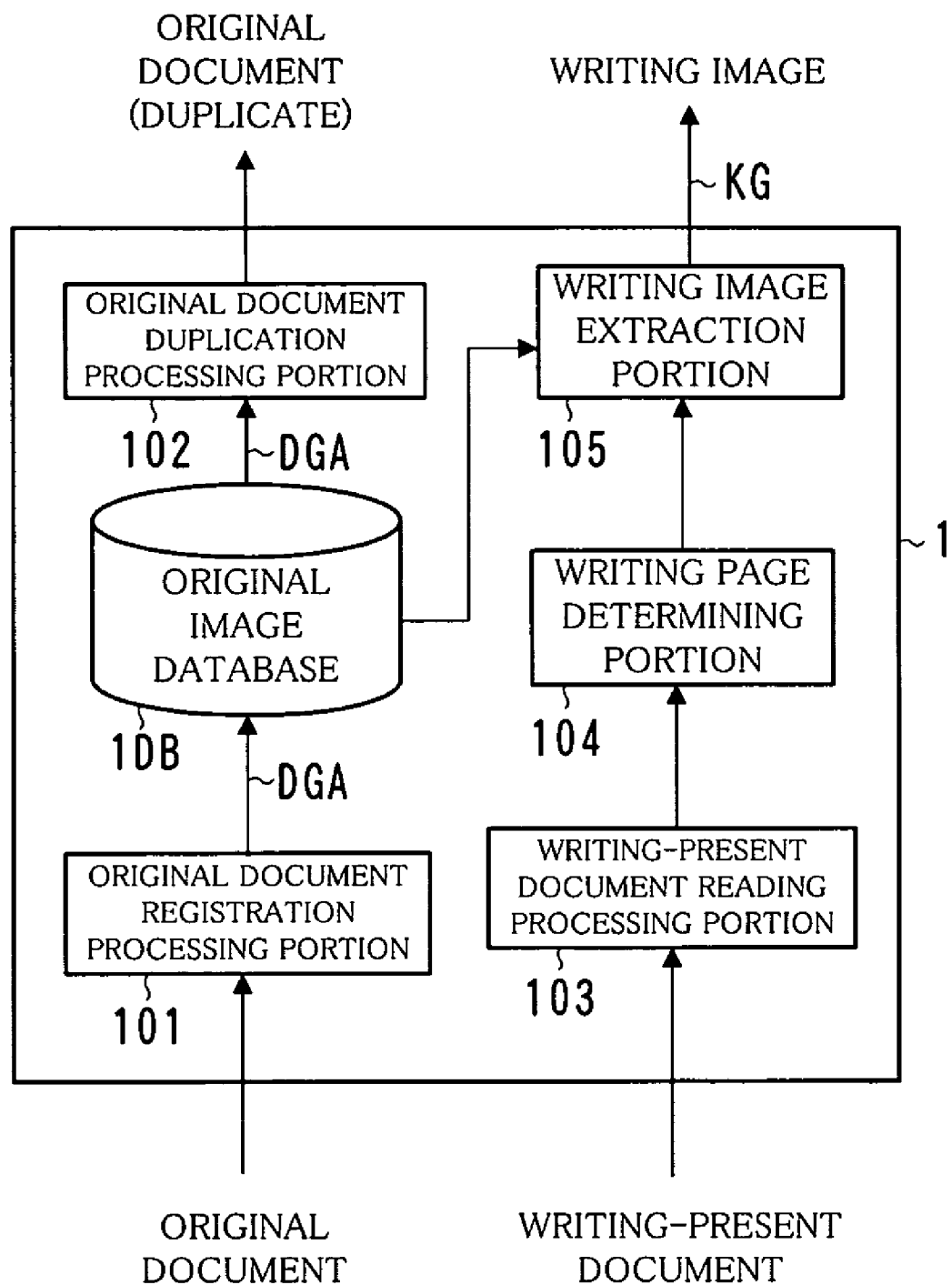
FIG. 4 shows an example of the functional configuration of an image forming apparatus.

FIG. 1 shows an example of the configuration of an entire network provided with an image forming apparatus 1 according to the present invention, FIG. 2 shows an example of the hardware configuration of the image forming apparatus 1, FIG. 3 shows an example of an operating panel 10*f* and FIG. 4 shows an example of the functional configuration of the image forming apparatus 1.

The image forming apparatus 1 according to the present invention, as shown in FIG. 1, is connected to one or a plurality of terminal apparatuses 2 via a communications line 3. As the communications line 3, a LAN, the Internet, a public line, a private line, or the like is used.

The image forming apparatus 1 is a processing apparatus in which various functions such as copy, scanner, fax, network printing, and document server functions are consolidated. Such a processing apparatus may also be referred to as a multifunction device, MFP (Multi-Function Peripheral), or the like.

The image forming apparatus 1 can be established in offices of the government, companies, or the like, public facilities such as schools or libraries, and various other locations, and shared by a plurality of users.

As shown in FIG. 2, the image forming apparatus 1 is configured by a CPU 10*a*, a RAM 10*b*, a ROM 10*c*, a hard disk 10*d*, a control circuit 10*e*, an operating panel 10*f*, a scanner unit 10*g*, a printing unit 10*h*, a communication interface 10*j*, a manuscript feed mechanism 10*k*, and the like.

The control circuit 10*e* is a circuit for controlling the hard disk 10*d*, the operating panel 10*f*, the scanner unit 10*g*, the printing unit 10*h*, the communication interface 10*j*, the manuscript feed mechanism 10*k*, and the like.

The scanner unit 10*g* is an apparatus that generates image data by optically reading an image of the contents of text, formulas, symbols, photographs, charts, illustrations and the like depicted on paper.

The manuscript feed mechanism 10*k* feeds one or a plurality of pages of paper that constitute a document in order to the scanner unit 10*g*. The manuscript feed mechanism 10*k* is compatible with so-called duplex manuscripts, so that with respect to each page of the document, after one face has been read by the scanner unit 10*g*, another face can be read by reversing the document and feeding the document to the scanner unit 10*g* again.

Below, of the sheets of paper constituting a document, a face on which contents are depicted is referred to as a "manuscript face". That is, when contents are depicted on both faces of the paper (in the case of a so-called duplex manuscript), both the front and back of the paper are manuscript faces, and when contents are depicted on only one face of the paper (in the case of a so-called simplex manuscript), only that face on which contents are depicted is a manuscript face. Ordinarily, a manuscript face may also be referred to as a "print face".

Also, in the present embodiment, the contents of one page of a document are depicted on one manuscript face. Accordingly, if the document consists of 10 pages, it has 10 manuscript faces. Below, an image depicted on one entire manuscript face (page) may be referred to as a "page image".

The printing unit 10*h* prints an image on paper based on image data obtained by the scanner unit 10*g* or image data sent from the terminal apparatus 2 or the like. The communication interface 10*j* is a NIC (Network Interface Card) or a modem or the like for performing communications with another apparatus.

As shown in FIG. 3, the operating panel 10*f* is configured by an operating portion SB and a display portion TD. A numeric keypad or the like is used as the operating portion SB, and a liquid crystal display or the like is used as the display portion TD. By operating the operating portion SB, a user can give commands to the image forming apparatus 1 to start or discontinue execution of processing, specify processing conditions such as data addresses, printing conditions, or scanning conditions, and specify various other items. On the display portion TD, screens for giving messages or instructions to the user, screens for inputting processing types and conditions desired by the user, screens for showing the results of processing executed by the image forming apparatus 1, and the like are displayed. When a touch panel is used as the operating panel 10*f*, the touch panel serves as both the operating portion SB and the display portion TD. In this manner, the operating panel 10*f* fulfills the role of a user interface for a user who operates the image forming apparatus 1.

Programs, data, and the like for realizing functions such as, as shown in FIG. 4, an original document registration processing portion 101, an original document duplication processing portion 102, a writing-present document reading processing portion 103, a writing page determining portion 104, a writing image extraction portion 105, an original image database 1DB, and the like, are stored on the hard disk 10*d*. These programs are read by the RAM 10*b* as necessary, and the programs are executed by the CPU 10*a*. All or a part of this data or these programs may be stored in the ROM 10*c*. Or, a configuration may be adopted in which all or part of the functions shown in FIG. 4 are realized by the control circuit 10e.

Returning to FIG. 1, application programs and drivers compatible with the image forming apparatus 1 are installed on the terminal apparatus 2, and a user can remotely use the image forming apparatus 1 by operating the terminal apparatus 2. A personal computer or a workstation or the like is used as the terminal apparatus 2.

Figure 5:
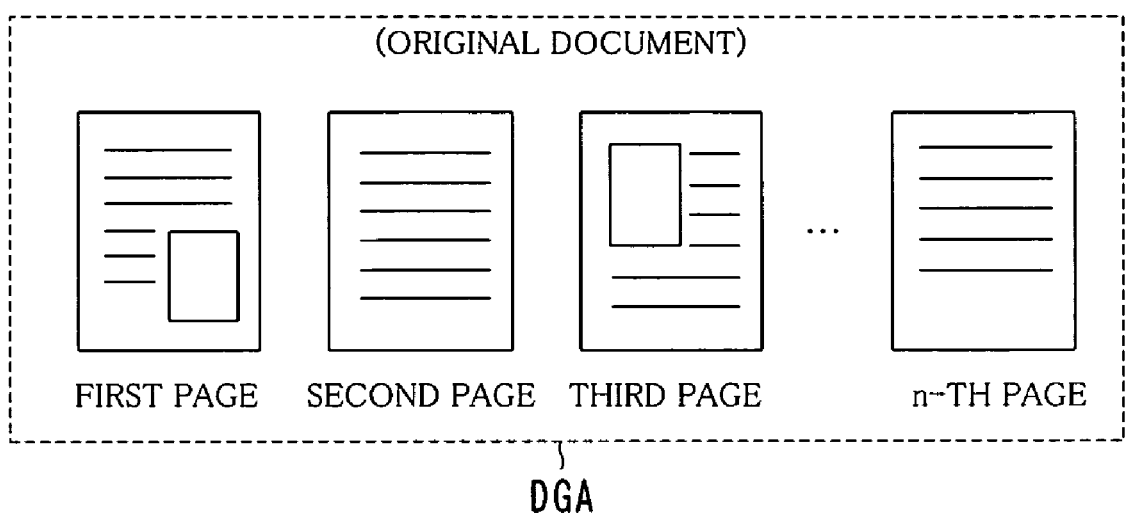
FIG. 5 shows an example of the configuration of an original document.
Figure 6:
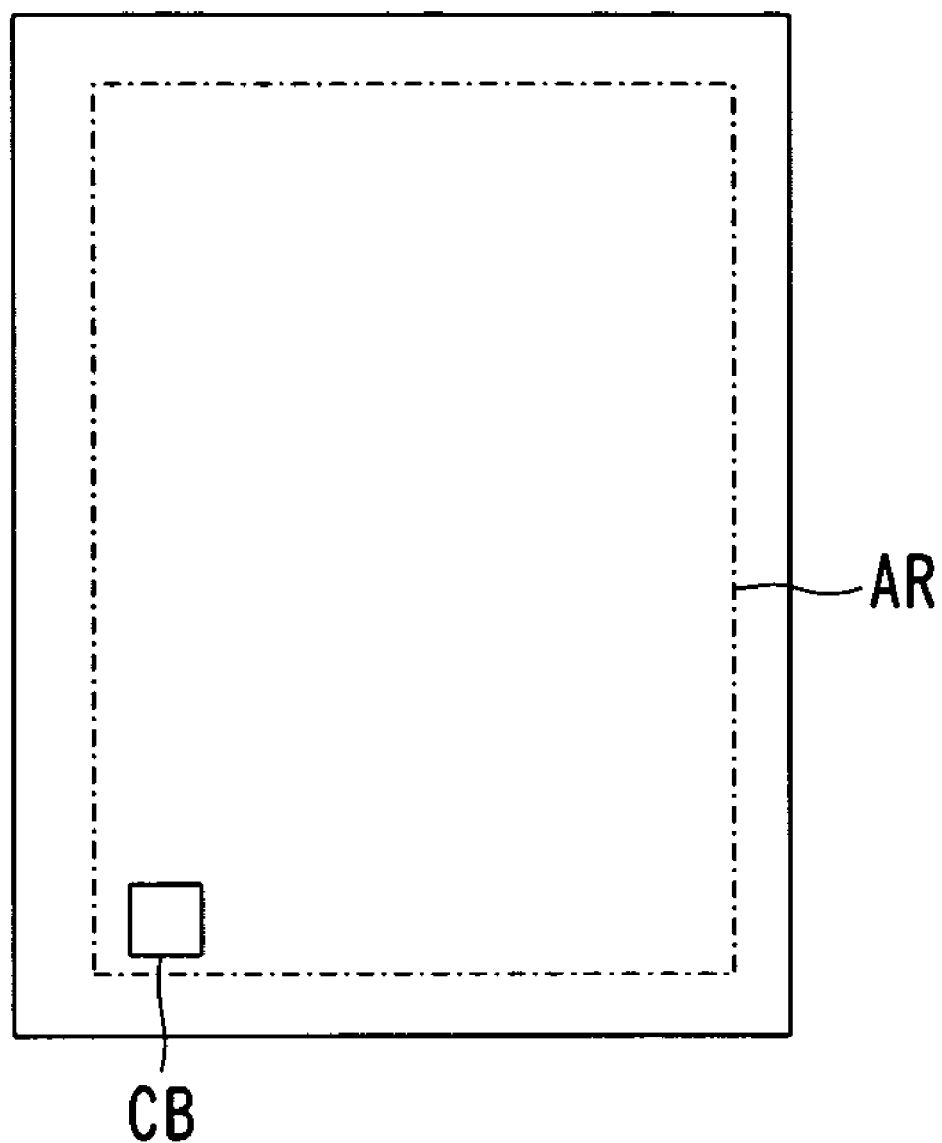
FIG. 6 shows an example of the arrangement of a writing-present checkbox in a page of a document.
Figure 7:
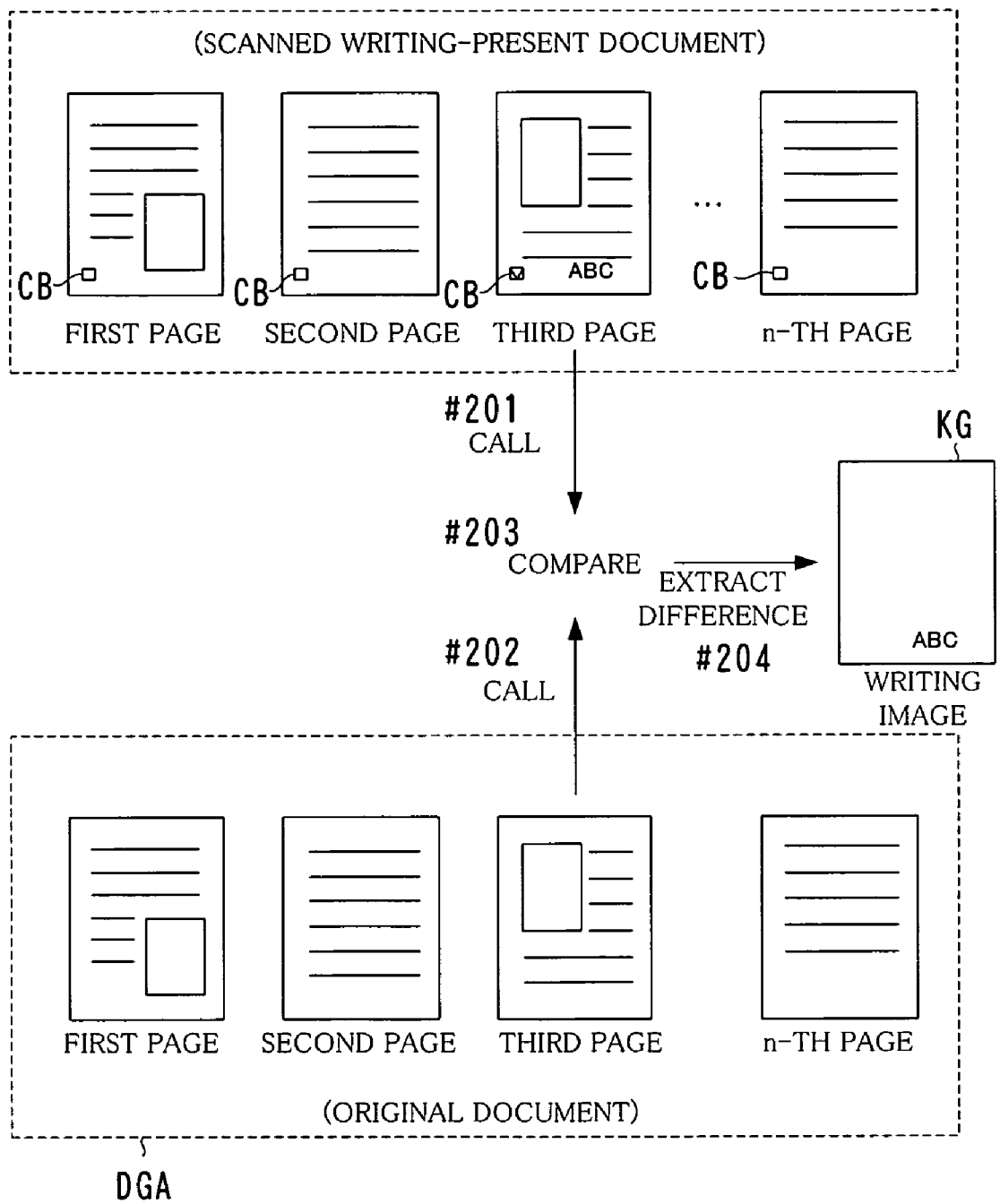
FIG. 7 illustrates an example of a method of generating a writing image.

FIG. 5 shows an example of the configuration of an original document, FIG. 6 shows an example of the arrangement of a writing-present checkbox CB in a page of a document and FIG. 7 illustrates an example of a method of generating a writing image KG.

Next, the contents of processing and the like of each portion of the image forming apparatus shown in FIG. 4 will be explained in detail.

Image data for reproducing a page image of each page of an original document is stored in the original image database 1DB. "Original document" means a document to which no information has been appended after the document was completed. For example, a document to be distributed to the attendees of a meeting, in a state immediately before being distributed, falls within the meaning of an original document. A model form for making various requests also falls within the meaning of an original document. Below, image data for reproducing page images of the pages that constitute an original document is referred to as "original image data DGA".

The original image data DGA of an original document is registered (stored) in the original image database 1DB by the original document registration processing portion 101, in the following manner, for example.

The user sets a document on which no information such as notes has been written, that is, an original document, in the manuscript feed mechanism 10k in a predetermined direction (front-back and up-down directions). Then, by operating the operating panel 10f, the user specifies whether contents are depicted on only one face or on both faces of the paper of that original document (i.e., whether a simplex manuscript or a duplex manuscript).

Then, the original document registration processing portion 101 controls the scanner unit 10g and the manuscript feed mechanism 10k in the following manner. The manuscript feed mechanism 10k is controlled such that the paper of the original document that has been set is fed page-by-page to the scanner unit 10g. The scanner unit 10g is controlled such that the page images depicted on the fed paper are scanned and image data is produced. When the user has specified that that original document is a duplex manuscript, the manuscript feed mechanism 10k and the scanner unit 10g are controlled such that the image data of the page images respectively depicted on the front face and back face of the paper is obtained. Also, page numbers are given to the page images of each manuscript face in the order that they are scanned.

By combining the image data of the page images of each page obtained in this way, the original image data DGA as shown in FIG. 5 is generated. As the format of the original image data DGA, PDF, TIFF, JPEG, or GIF and the like are used. The generated original image data DGA is assigned to identifying information for the original document (for example, file name or document name or the like), and registered in the original image database 1DB. The identifying information may be specified by the user, or the identifying information may be determined by the original document registration processing portion 101.

When the user wants to print and read the original document on paper, the identifying information of that original document is specified to the image forming apparatus 1 by operating the operating panel 10f.

Then, the original document duplication processing portion 102 calls the original image data DGA of the original document associated with that identifying information from the original image database 1DB. Based on that original image data DGA, an image with a writing-present checkbox CB superimposed is generated at a predetermined position of the page image of each page of that original document. Then, the printing unit 10h is controlled such that a page image with the writing-present checkbox CB superimposed for each page is printed on paper. As shown in FIG. 6, the writing-present checkbox CB is provided at a predetermined position of the paper inside the range printable by the printing unit 10h (below, "printable range AR"). Also, the writing-present checkbox CB is expressed by lines of a color different from the color of the paper of the original document. For example, when the color of the paper is white, the writing-present checkbox CB is expressed by lines of black or blue or the like.

In this manner, the user can obtain a duplicate of the original document. As stated above, the writing-checkbox CB is provided in this duplicate. However, this writing-checkbox CB is used to control the extraction of writing images, described below, and is not information such as written notes. Accordingly, this duplicate can also be said to be an original document.

The user can also obtain a print of the original document by operating the terminal apparatus 2. In this case as well, the user specifies the identifying information of a desired original document to the terminal apparatus 2.

Then, the terminal apparatus 2 makes a request to the image forming apparatus 1 for the original image data DGA that corresponds to that identifying information, and downloads that original image data DGA. Then, using a printing apparatus connected to the terminal apparatus 2 via a USB (Universal Serial Bus) or a parallel port or the like, in the same manner as the processing by the original document duplication processing portion 102, an image of each page of that original document is printed to paper in a state with the writing-present checkbox CB provided at a predetermined position in the page.

The user can write information such as notes or the like into a print of the original document obtained in this manner using a pen. It is also possible to write information into that print by pasting clippings from another document to blank portions of that print. Below, a document in which writing has been performed for some or all of the pages in this manner is referred to as a "writing-present document". However, using a pen a mark (stamp) such as a checkmark or circle is added inside the writing-present checkbox CB of pages in which a writing has been added. It is possible to cause the image forming apparatus 1 to execute processing that extracts images that express the written information and converts them to electronic data. This processing is executed in the following manner using the writing-present document reading processing portion 103 and the writing page determining portion 104.

To prepare for the processing, the user sets an original document for which writing has been performed, that is, a writing-present document, in the manuscript feed mechanism 10k in a predetermined direction (front-back and up-down directions). Also in the case that writing has been performed to only some of the pages, all of the paper that constitutes the writing-present document is gathered and set in the original page order in the manuscript feed mechanism 10k. Then, by operating the operating panel 10f, the user specifies whether the document is a simplex manuscript or a duplex manuscript, and specifies identifying information for that document.

Then, the writing-present document reading processing portion 103 controls the scanner unit 10g and the manuscript feed mechanism 10k in the following manner. The manuscript feed mechanism 10k is controlled such that the paper of the set writing-present document is fed page-by-page to the scanner unit 10g. The scanner unit 10g is controlled such that the images depicted on the fed paper are read. When it has been specified by the user that that writing-present document is a duplex manuscript, the manuscript feed mechanism 10k and the scanner unit 10g are controlled such that the images on both the front face and the back face of the paper are read. Also, page numbers are given to the page images of each manuscript face in the order that they are scanned.

Based on the images obtained by the processing of the writing-present document reading processing portion 103, the writing page determining portion 104 determines the pages of the writing-present document that have a writing. That is, the writing page determining portion 104 confirms whether or not there is a mark such as a checkmark or a circle in the position of the writing-present checkbox CB of the obtained images. Then, the pages of the images in which there is a mark are determined to be the pages in which there is a writing. The pages of the images in which there is not a mark are determined to be the pages in which there is not a writing.

The writing image extraction portion 105 performs processing for extracting images of writings from the images of the pages of the writing-present document in which it has been determined that there is a writing, and converting the extracted images to electronic data. This processing is performed in an order such as that shown in FIG. 7, for example.

Of the images of the writing-present document, the images of the pages in which it has been determined that there is a writing, obtained by the writing-present document reading processing portion 103, are called (#201 in FIG. 7). The images of the same page numbers as images of the pages called in Step #201 are called (#202) from among the original image data DGA of the original document related to the identifying information the user has specified, stored in the original image database 1DB (that is, the original document that corresponds to that writing-present document).

Then, by comparing both called images, the difference in images is extracted, and image data of an image that expresses the difference is generated (#203, #204). However, the writing-present checkbox CB and the image (mark) therein are information used for control, and are therefore removed. An image obtained in this manner is a writing image KG that expresses information such as notes written by the user.

The generated writing image KG is displayed on the operating panel 10f or the like, stored on the hard disk 10d or another storage medium as an image file, or sent to another apparatus via the communications line 3 or the like.

The processing described with the flowchart in FIG. 7 is not executed for pages in which it has been determined that there is not a writing.

Figure 8:
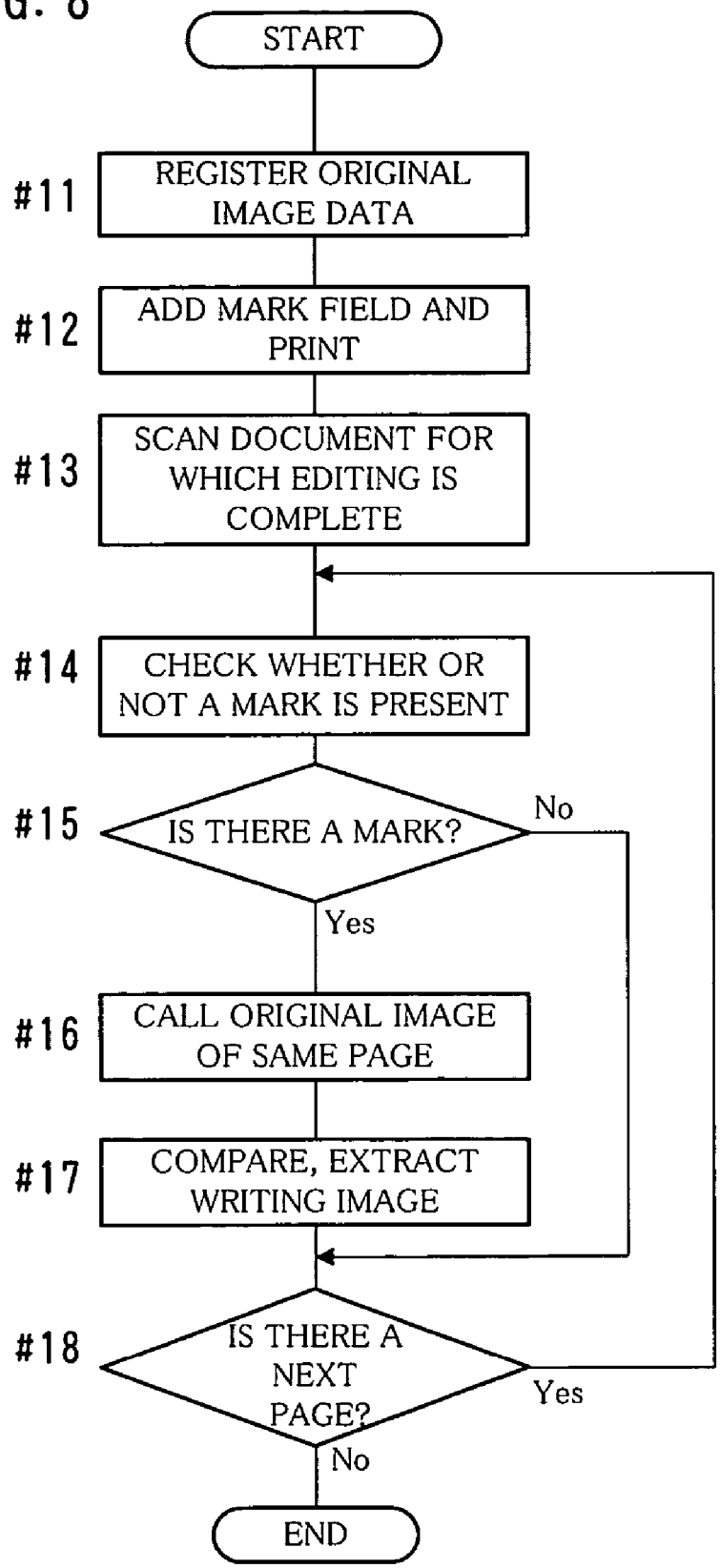
FIG. 8 is a flowchart for illustrating an example of the entire flow of processing of an image forming apparatus in a first embodiment.

FIG. 8 is a flowchart for illustrating an example of the entire flow of processing of the image forming apparatus 1 in the first embodiment. Next, the flow of processing that generates a writing image KG with the image forming apparatus 1 in the first embodiment will be explained with reference to the flowchart in FIG. 8. The processing shown in FIG. 8 and in each flowchart subsequently described is controlled by the CPU 10a.

The image forming apparatus 1, by scanning an original document in advance, generates an original image data DGA for reproducing that original document, and registers the original image data DGA associated with the identifying information for that original document in the original image database 1DB (#11 in FIG. 8).

According to a request from the user, a duplicate of the original document is printed to paper, in a state with the writing-present checkbox CB provided in a predetermined position of each page (#12).

Here, the user freely writes information such as notes to a duplicate of the original document that has been printed. However, a mark is placed in the writing-present checkbox CB of pages in which the user has written. Then, the image forming apparatus 1 is caused to scan the document in which information has been written, that is, the writing-present document (#13). At this time, identifying information of its original document is specified.

Then, the image forming apparatus 1 checks whether or not a mark has been made in the writing-present checkbox CB of the pages of the scanned writing-present document (#14), and when a mark has been made (Yes in #15), the page image of the page of the original document associated with the identifying information the user has specified with the same page number as that page in which a mark has been made is called from the original image database 1DB (#16). Then, by comparing the scanned image of that page (i.e., the image of the writing-present document) and the called image (i.e., the image of the original document), and extracting that difference, the writing image KG is generated (#17).

On the other hand, when a mark has not been made (No in #15), there is not a writing in that page, and so generation of the writing image KG is not performed.

The processing in Steps #14 to 17 is performed for all of the scanned pages, according to whether or not there is a mark.

According to the present embodiment, the pages in which a user has performed writing are determined, extraction processing of the writing image KG is performed only for pages in which it has been determined that there is a writing, and extraction processing is not performed for pages in which it has been determined that there is not a writing. Thus, it is possible to obtain electronic data of the writing image KG more effectively than with the conventional technology. Particularly, even when the original document consists of a large number of pages but writing has been performed in only a few of those pages, it is possible to effectively obtain electronic data of the writing image KG without performing wasteful processing as with the conventional technology for pages in which there is not a writing.

Figure 9A:
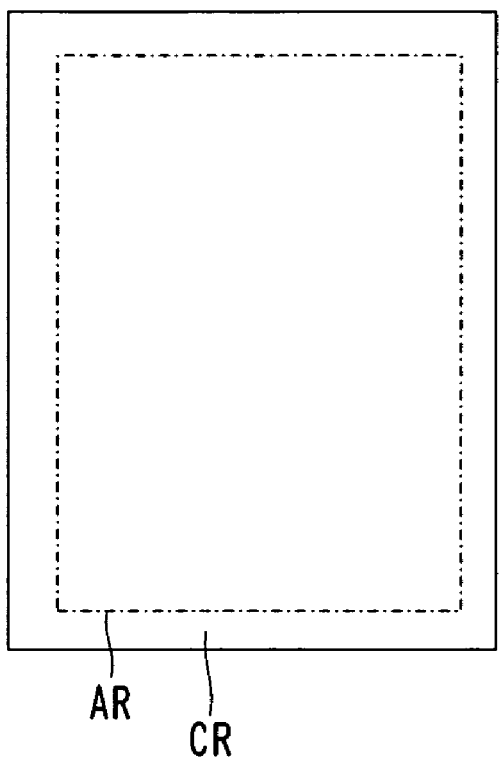
FIGS. 9A and 9B show an example of the arrangement of a writing-present check region in a page of a document.
Figure 9B:
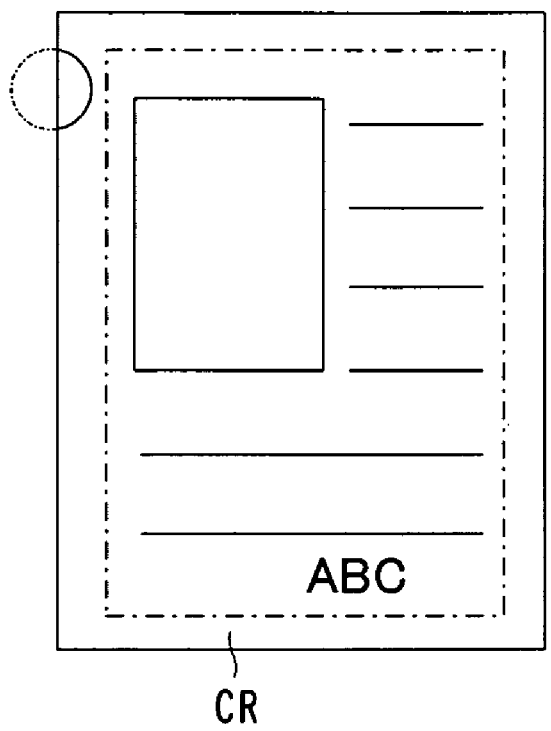

FIGS. 9A and 9B show an example of the arrangement of a writing-present check region CR in a page of a document. In the present embodiment, as described in FIG. 6, a writing-present checkbox CB is provided in each page of a duplicate of the original document as a region for clearly indicating that information such as notes has been written, but a portion outside of the printable region AR may also be used as this region. That is, as shown in FIG. 9A, the region outside of a printable region AR in the paper is made the writing-present check region CR. This writing-present check region CR is a region in which printing with the printing unit 10h is not possible but reading with the scanner unit 10g is possible.

As shown in FIG. 9B, the user inserts a mark such as a half circle in the writing-present check region CR of pages in which writing of notes or the like has been performed. Then, the writing page determining portion 104 of the image forming apparatus 1 checks the writing-present check region CR of each page of the scanned writing-present document, and determines that there is a writing for pages in which a mark has been made and that there is not a writing for pages in which a mark has not been made.

Also, in this case, the original document duplication processing portion 102 executes processing for printing a duplicate of the original document without providing the writing-present checkbox CB.

Figure 10:
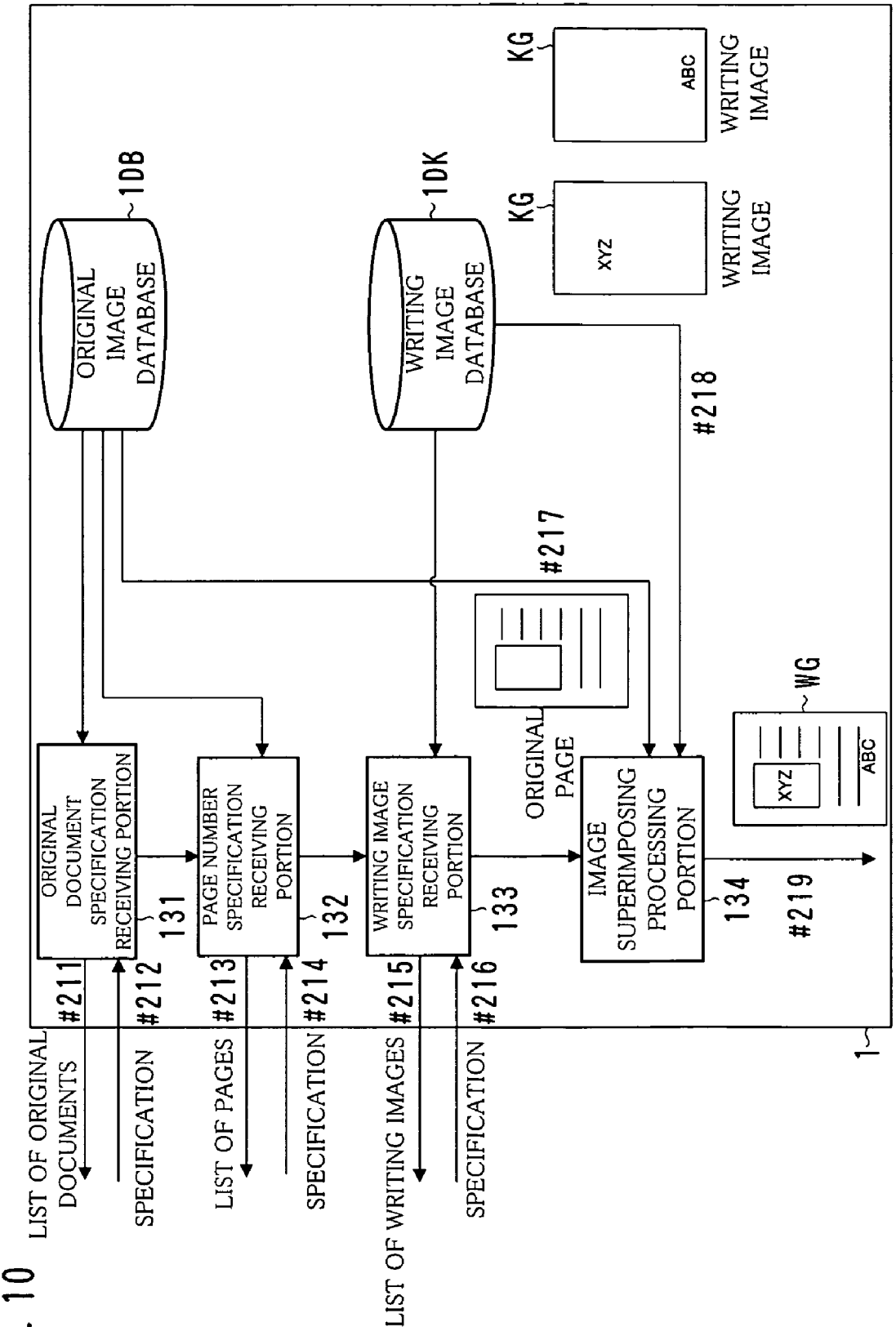
FIG. 10 shows an example of the functional configuration for generating a superimposed image.

FIG. 10 shows an example of the functional configuration for generating a superimposed image WG and FIG. 11 shows an example of a writing image database 1DK.

The writing images KG obtained from the writing-present document can be output to paper with them superimposed on the original document or the like. It is also possible to output with a plurality of writing images KG superimposed on one original document. The processing for these kinds of output can be realized with, for example, the following sort of method.

As shown in FIG. 10, the image forming apparatus 1 is provided with an original document specification receiving portion 131, a page number specification receiving portion 132, a writing image specification receiving portion 133, an image superimposing processing portion 134, and a writing image database 1DK.

As shown in FIG. 11, image data of the writing images KG obtained by the writing image extraction portion 105 (see FIG. 4) are saved in the writing image database 1DK. In the image data of a writing image KG, the identifying information of that writing image KG, identifying information of the document in which that writing image KG is written, that is, of the original document and the page number, are associated.

The original document specification receiving portion 131 displays a list of the original documents that have been registered in the original image database 1DB on the operating panel 10f (#211), and receives specification of an original document for which the user desires output (#212).

The page number specification receiving portion 132 displays a list of the pages that constitute the original document associated with the specification received by the original document specification receiving portion 131 (#213), and receives specification of pages for which the user desires output (#214).

The writing image specification receiving portion 133 displays a list of the writing images KG of writings that have been previously written to the pages received by the page number specification receiving portion 132 (#215), and performs processing for receiving specification of writing images KG which the user desires to superimpose on those pages (#216).

The image superimposing processing portion 134 calls the original image data DGA of the original document specified by the user from the original image database 1DB, and extracts image data of the images of the pages specified by the user from among that original image data DGA (#217). Further, it calls the image data of the writing images KG specified by the user from among the writing image-database 1DK (#218). Then, a superimposed image WG is generated by superimposing the writing images KG on the pages of the original document based on this image data (#219). FIG. 10 shows an example in which two writing images KG are superimposed on one page of an original document. This superimposed image WG is output to paper or the like by printing. It may also be output as an image file, and it may also be output by being displayed on the operating panel 10f.

Second Embodiment

Figure 12:
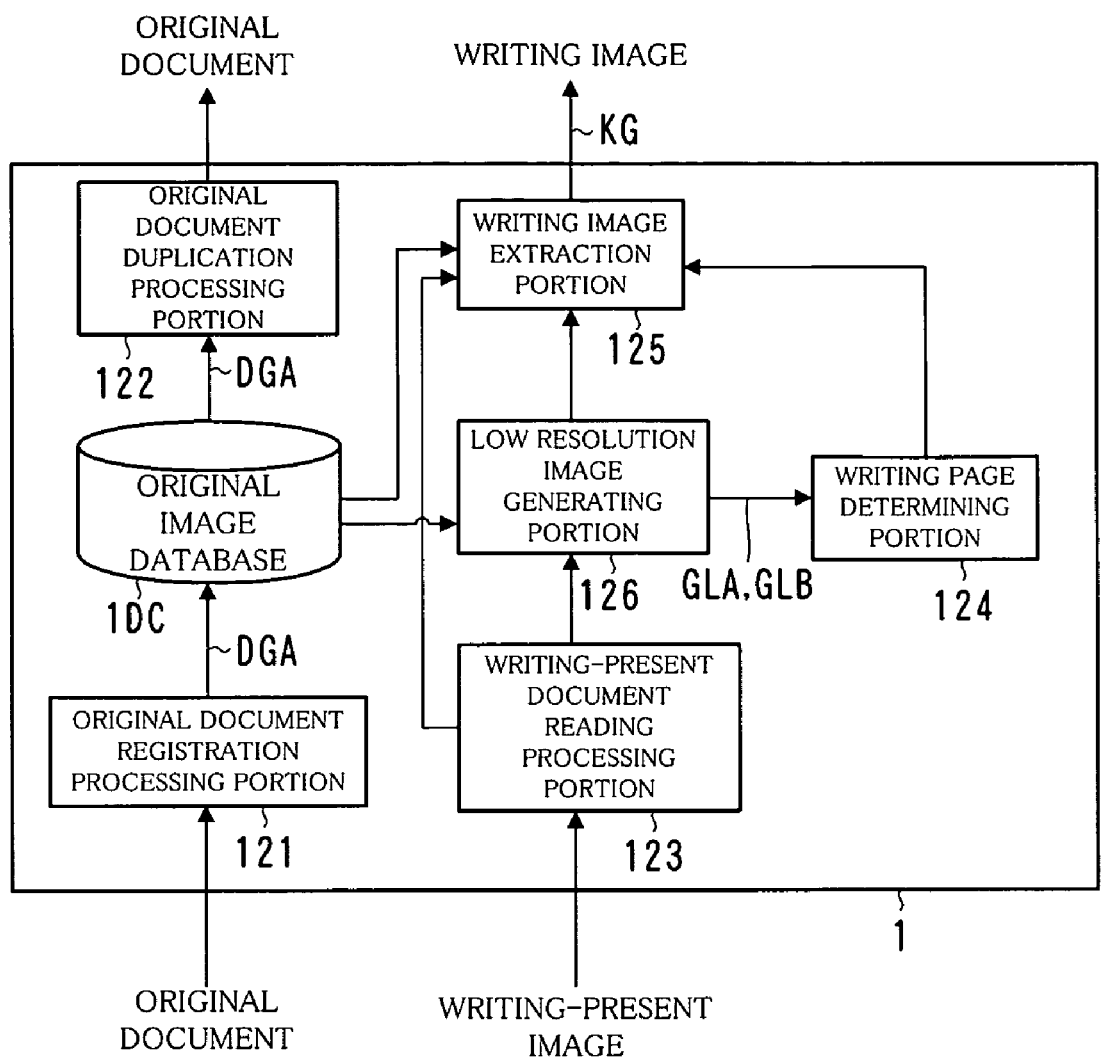
FIG. 12 shows a modified example of the functional configuration of an image forming apparatus.
Figure 13:
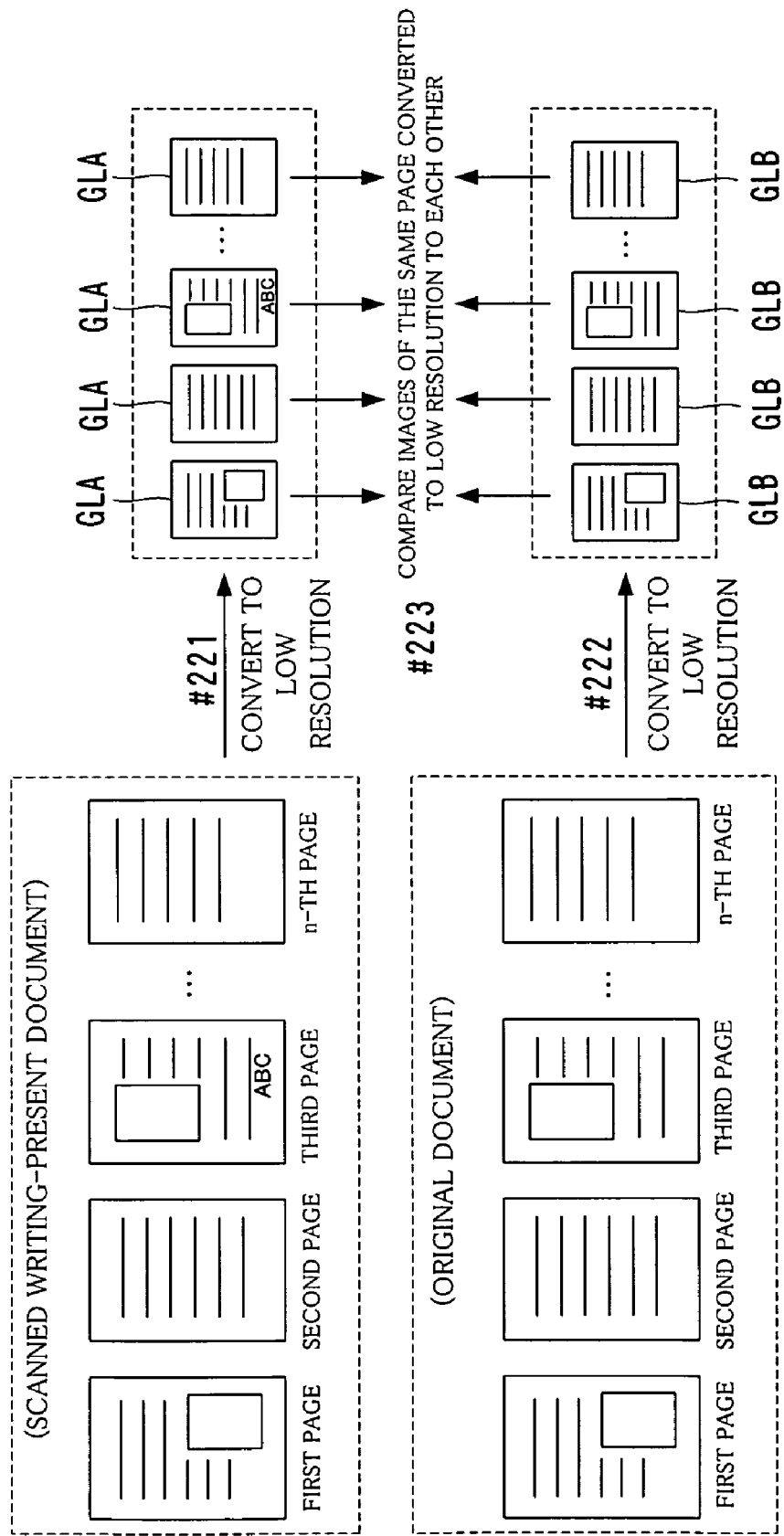
FIG. 13 illustrates an example of a method for determining pages which contain a writing.

FIG. 12 shows a modified example of the functional configuration of the image forming apparatus 1 and FIG. 13 illustrates an example of a method for determining pages which contain a writing.

In the first embodiment, pages in which information such as notes had been written were determined by the presence or absence of a mark in the writing-present checkbox CB or the writing-present check region CR. In the second embodiment, pages in which information such as notes have been written is determined by comparing the images of each page of an original document converted to low resolution images and the images of each page of a writing-present document.

The below description focuses on the points that differ from the first embodiment. Description of points that are shared with the first embodiment are omitted.

The hardware configuration of the image forming apparatus 1 of the second embodiment is the same as in the case of the first embodiment, and is as shown in FIG. 2. However, programs, data, and the like for realizing functions such as, as shown in FIG. 12, an original document registration processing portion 121, an original document duplication processing portion 122, a writing-present document reading processing portion 123, a writing page determining portion 124, a writing image extraction portion 125, a low resolution image generating portion 126, and an original image database 1DC and the like are stored on the hard disk 10d.

The contents of processing of the original document registration processing portion 121, the original document duplication processing portion 122, the writing-present document reading processing portion 123, the writing image extraction portion 125, and the original image database 1DC in FIG. 12 are basically the same as the contents of processing of the original document registration processing portion 101, the original document duplication processing portion 102, the writing-present document reading processing portion 103, the writing image extraction portion 105, and the original image database 1DB (see FIG. 4). However, the original document duplication processing portion 122, unlike in the case of the first embodiment, generates a duplicate of the original document without providing a writing-present checkbox CB.

With a method as shown in FIG. 13, the writing page determining portion 124 and the low resolution image generating portion 126 perform processing to determine the pages of the writing-present document in which information such as notes have been written.

The low resolution image generating portion 126 converts the images of each page obtained by the processing of the writing-present document reading processing portion 123, which are images of a document in which the user has performed writing, i.e., a writing-present document, to low resolution images of a predetermined resolution (below, referred to as "resolution $\alpha$") (#221 of FIG. 13). Below, the images of each page of the writing-present document that have been converted to low resolution are referred to as "first low resolution images GLA". Further, the images of each page registered in the original image database 1DC, which are images of the source document of that writing-present document, i.e., the original document, are converted to the low resolution of resolution $\alpha$ (#222). Below, the images of each page of the original document that have been converted to low resolution are referred to as "second low resolution images GLB".

The writing page determining portion 124 discriminates pages in which there is a writing by comparing the first low resolution image GLA and the second low resolution image GLB of the same page number to each other (#223). Specifically, it is determined that there is no writing when the first low resolution image GLA and the second low resolution image GLB are the same, and it is determined that there is a writing when they are different.

Figure 14:
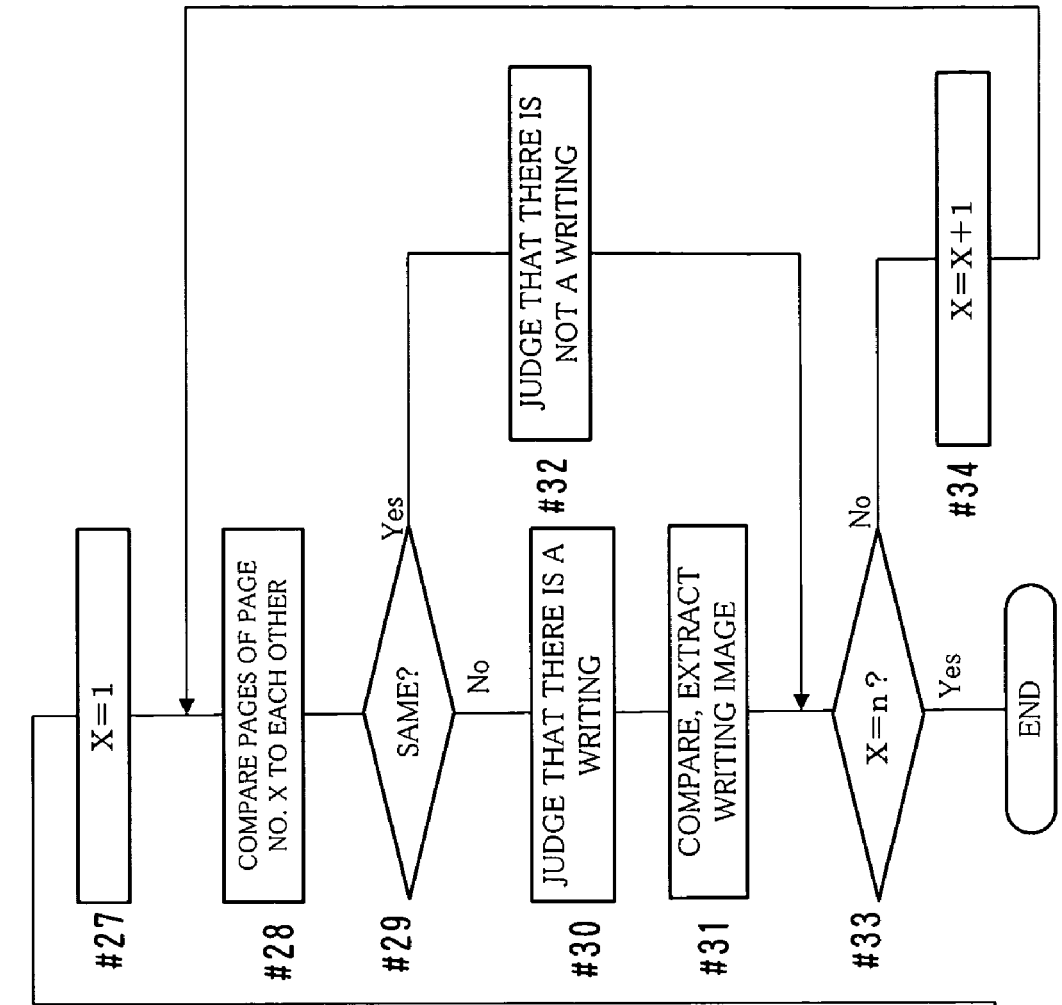
FIG. 14 is a flowchart for illustrating an example of the entire flow of processing of an image forming apparatus in a second embodiment.
Figure 14:
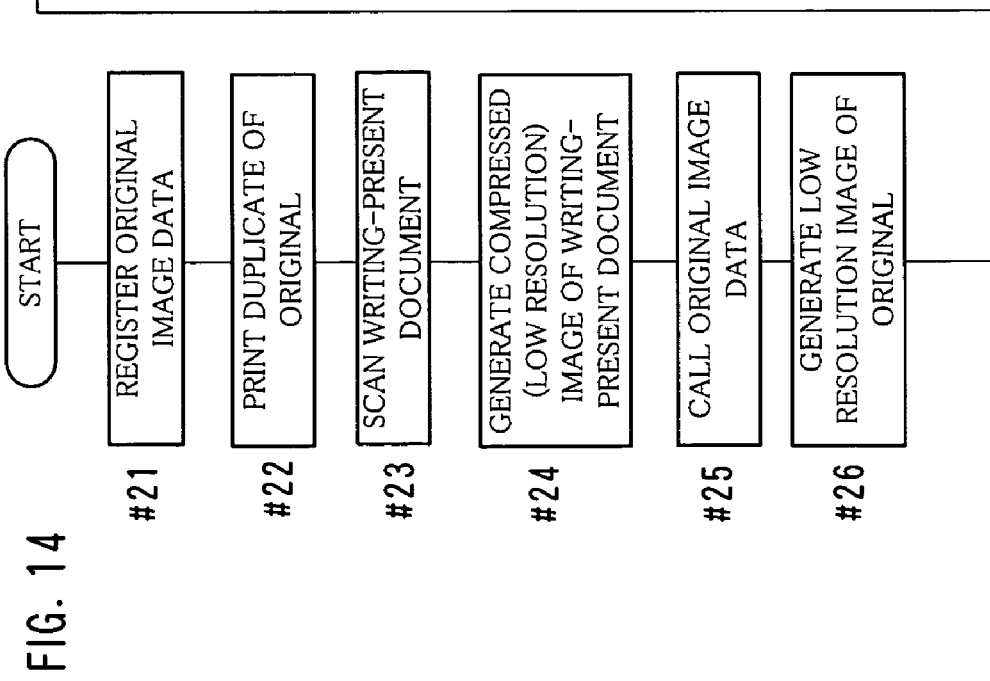

FIG. 14 is a flowchart for illustrating an example of the entire flow of processing of the image forming apparatus 1 in the second embodiment. Next, the flow of processing that generates a writing image KG with the image forming apparatus 1 in the second embodiment will be explained with reference to the flowchart in FIG. 14.

The image forming apparatus 1, by scanning an original document in advance, registers the original image data DGA for that original document, associated with the identifying information for that original document, in the original image database 1DC (#21 in FIG. 14). Then, according to a request from the user, a duplicate of the original document is printed to paper (#22).

Here, the user freely writes information such as notes to the duplicate of the original document that has been printed. However, unlike in the case of the first embodiment, it is not necessary to insert a mark in pages in which the user has written. Then, the image forming apparatus 1 is caused to scan the document in which information has been written, that is, the writing-present document (#23). Also, at this time, the user specifies identifying information of the original document to the image forming apparatus 1.

Then, the image forming apparatus 1 generates a first low resolution image GLA for each page of the scanned writing-present document (#24). In parallel with this or before or after, the original image data DGA of the original document associated with the identifying information specified by the user (i.e., the original document that corresponds to that writing-present document) is called (#25), and a second low resolution image GLB is generated for each page of that original document (#26).

In order from the first page, the first low resolution image GLA and the second low resolution image GLB of the same page number are compared (#28). When they are not both the same (No in #29), it is determined that there is a writing in that page of the writing-present document (#30). Accordingly, same as in the case of the first embodiment, by comparing the image of that page of the writing-present document and the image of that page of the original document, and extracting the difference, a writing image KG is generated (#31). Also, in Step #31, an image with the original resolution is used, not the image with reduced resolution obtained in Steps #24 and #26

On the other hand, when they are both the same (Yes in #29), it is determined that there is not a writing in that page of the writing-present document (#32). Thus, processing to generate a writing image KG is not performed for that page.

The processing in Steps #28 to 32 is performed for all of the scanned pages, according to the results of determining whether or not there is a writing.

According to the second embodiment, it is not necessary to insert a mark in the writing-present checkbox CB as in the case of the first embodiment. Also, it is not necessary to worry about forgetting to insert a mark. Accordingly, the user can more easily and reliably execute the processing that extracts the writing images KG.

The writing images KG obtained by the second embodiment also, same as in the case of the first embodiment, by a method such as that described with FIG. 10, are used to, for example, be freely superimposed on the original document and generate the superimposed images WG.

In the first and second embodiments, a case was described by way of example in which the contents of one page of a document were depicted on one manuscript face, but the present invention can also be applied in a case in which the contents of a plurality of pages of a document are depicted on one manuscript face, that is, in the case of a type of so-called N-in-1 printing. In this case, the processing that extracts the writing images KG may be performed with a plurality of pages of one manuscript face deemed to be one page. Also, the processing that extracts the writing images KG may be performed after dividing the manuscript face images obtained by scanning the original document and the writing-present document respectively into one page each.

In the first and second embodiments, a case was described by way of example in which processing was executed to extract the writing images KG with the image forming apparatus 1, which is an MFP or the like, but it is also possible to adopt a configuration in which the processing is performed by a personal computer or workstation or the like to which a printing apparatus and a scanner apparatus are connected.

It is also possible to appropriately modify all or each part of the configuration, contents of processing, sequence of processing, and the like of the image forming apparatus 1 in accordance with the gist of the present invention.

The present invention is suitably used particularly in the case of extracting writings from a document consisting of a large number of pages.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A writing image acquisition apparatus, comprising:
a page image input portion that inputs a page image that is an image of a page constituting a document;
an original image storage portion that stores an original page image that is an image of the page in a state in which there is not a writing;
a writing page determining portion that determines whether there is a writing on the page based on whether there is a written mark in a predetermined position of the page image; and
a writing image extraction portion that, if determined that there is a writing on the page by the writing page determining portion, performs writing image extraction processing that extracts from the page image a writing image that is an image of the writing by comparing the page image with the original page image, and if determined that there is not a writing on the page by the writing page determining portion, does not perform the writing image extraction processing.

2. The writing image acquisition apparatus according to claim 1, wherein
the writing image extraction portion extracts the writing image if determined that there is a writing by obtaining a difference between the page image and the original page image.

3. The writing image acquisition apparatus according to claim 2, wherein the predetermined position is indicated by a region surrounded by a line of a different color than a color of a paper of the page, and
the writing image extraction portion extracts the writing image in a state excluding the region and the mark.

4. The writing image acquisition apparatus according to claim 2, wherein the predetermined position is a region in a paper of the page in which a printing apparatus that prints the document cannot print.

5. A writing image acquisition apparatus, comprising:
a page image input portion that inputs a page image that is an image of a page constituting a document;

an original image storage portion that stores an original page image that is an image of the page in a state in which there is not a writing;

a writing page determining portion that determines whether there is a writing on the page based on whether there is a written mark in a predetermined position of the page image; and a writing image extraction portion that, if determined that there is a writing on the page by the writing page determining portion, performs writing image extraction processing that extracts from the page image a writing image that is an image of the writing by obtaining a difference between the page image and the original page image, and if determined that there is not a writing on the page by the writing page determining portion, does not perform the writing image extraction processing.

6. The writing image acquisition apparatus according to claim 5, wherein the predetermined position is indicated by a region surrounded by a line of a different color than a color of a paper of the page, and the writing image extraction portion extracts the writing image in a state excluding the region and the mark.

7. The writing image acquisition apparatus according to claim 5, wherein the predetermined position is a region in a paper of the page in which a printing apparatus that prints the document cannot print.

8. A writing information extraction method for extracting additional information written to a document corresponding to an original, comprising:

a providing step comprising providing a storage medium storing an original page image that is an image of a page constituting the document in a state in which additional information is not written;

an inputting step comprising inputting a page image that is an image of the page constituting the document;

a determining step comprising determining whether there is a writing on the page based on whether there is a written mark in a predetermined position of the page image; and a performing step comprising performing writing image extraction processing, if it is determined that there is a writing on the page in the determining step, to extract from the page image a writing image that is an image of the additional information written on the page by comparing the page image with the original page image, and not performing the writing image extraction processing if determined that there is not a writing on the page in the determining step.

9. A writing information extraction method for extracting additional information written to a document corresponding to an original, comprising:

a providing step comprising providing a storage medium storing an original page image that is an image of a page constituting the document in a state in which additional information is not written;

an inputting step comprising inputting a page image that is an image of the page constituting the document;

a determining step comprising determining whether there is a writing on the page based on whether there is a written mark by a user in a predetermined position of the page image; and a performing step comprising performing writing image extraction processing, if determined that there is a writing on the page in the determining step, to extract from the page image a writing image that is an image of the additional information written on the page by obtaining a difference between the page image and the original page image, and not performing the writing image extraction processing if determined that there is not a writing on the page in the determining step.

10. The writing information extraction method according to claim 9, wherein the predetermined position is indicated by a region surrounded by a line of a different color than a color of a paper of the page, and the writing image is extracted in a state excluding the region and the mark.

11. The writing information extraction method according to claim 9, wherein the predetermined position is a region in a paper of the page in which a printing apparatus that prints the document cannot print.

12. A non-transitory computer-readable storage medium storing a computer program for use in a computer that executes processing for extracting additional information written to a document corresponding to an original, the computer being capable of accessing an original image storage portion that stores an original page image that is an image of a page constituting the document in a state in which there is not a writing, the computer program causing the computer to execute:

a process of inputting a page image that is an image of the page constituting the document;

a process of determining whether there is a writing on the page based on whether there is a written mark by a user in a predetermined position of the page image; and a process of extracting from the page image, only if determined that additional information is written on the page, a writing image that is an image of the additional information by comparing the page image with the original page image.

13. A non-transitory computer-readable storage medium storing a computer program for use in a computer that executes processing for extracting additional information written to a document corresponding to an original, the computer being capable of accessing an original image storage portion that stores an original page image that is an image of a page constituting a document in a state in which there is not a writing, the computer program causing the computer to execute:

a process of inputting a page image that is an image of the page constituting the document to determine whether there is additional information written on the page; and a process of determining whether there is a writing on the page based on whether there is a written mark by a user in a predetermined position of the page image; and a writing image extraction process of extracting from the page image, only if determined that additional information is written on the page, a writing image that is an image of the additional information by obtaining a difference between the page image and the original page image.

14. The non-transitory computer-readable storage medium according to claim 13, wherein the predetermined position is indicated by a region surrounded by a line of a different color than a color of a paper of the page, and in the writing image extraction process, the computer program causes the computer to extract the writing image in a state excluding the region and the mark.

15. The non-transitory computer-readable storage medium according to claim 13, wherein the predetermined position is a region in a paper of the page in which a printing apparatus that prints the document cannot print.

* * * * *